(12) United States Patent
Chiproot

(10) Patent No.: US 10,948,119 B2
(45) Date of Patent: Mar. 16, 2021

(54) PIPE COUPLING CAPSULATION ASSEMBLY WITH RETAINING ELEMENTS

(71) Applicant: Eliezer Krausz Industrial Development Ltd., Tel Aviv (IL)

(72) Inventor: Avi Chiproot, Kfar-Saba (IL)

(73) Assignee: Krausz Industries Ltd., Rosh HaAyin (IL)

(*) Notice: Subject to any disclaimer, the term of this patent is extended or adjusted under 35 U.S.C. 154(b) by 517 days.

(21) Appl. No.: 15/859,841

(22) Filed: Jan. 2, 2018

(65) Prior Publication Data
US 2019/0203870 A1    Jul. 4, 2019

(51) Int. Cl.
*F16L 55/172* (2006.01)
*F16L 21/02* (2006.01)
*F16L 21/06* (2006.01)
*F16L 21/00* (2006.01)

(52) U.S. Cl.
CPC ......... *F16L 55/1725* (2013.01); *F16L 21/005* (2013.01); *F16L 21/022* (2013.01); *F16L 21/065* (2013.01); *F16L 55/172* (2013.01)

(58) Field of Classification Search
CPC ... F16L 55/1725; F16L 55/172; F16L 21/005; F16L 21/022; F16L 21/065
USPC ......................................... 285/342–343, 373
See application file for complete search history.

(56) References Cited

U.S. PATENT DOCUMENTS

| | | | | |
|---|---|---|---|---|
| 2,286,751 A | * | 6/1942 | Merrill | F16L 55/172 138/99 |
| 3,708,187 A | * | 1/1973 | Campbell | F16L 9/06 285/373 |
| 4,380,348 A | * | 4/1983 | Swartz | F16L 25/14 285/236 |
| 4,492,393 A | * | 1/1985 | Schaub | F16L 21/005 24/275 |
| 8,894,100 B2 | * | 11/2014 | Eaton | F16L 21/08 285/323 |
| 9,551,444 B2 | | 1/2017 | Chiproot | |
| 2016/0208964 A1 | * | 7/2016 | Chiproot | F16L 21/065 |

FOREIGN PATENT DOCUMENTS

| | | | |
|---|---|---|---|
| CH | 682416 | 9/1993 | |
| DE | 8804348 | 10/1988 | |
| DE | 102012101553 A1 | * 8/2013 | ............. F16L 25/14 |

OTHER PUBLICATIONS

PCT Search Report and Written Opinion PCT/IB2019/050004, dated Apr. 8, 2019.

* cited by examiner

*Primary Examiner* — Matthew Troutman
*Assistant Examiner* — Fannie C Kee
(74) *Attorney, Agent, or Firm* — Dekel Patent Ltd.; David Klein

(57) ABSTRACT

A pipe coupling capsulation assembly includes a band having an inner annular seal element wrappable around a pipe, opposing clamp members that extend from the band, at least one tightening element for clamping together the clamp members, and a plurality of retaining elements extending from the band. Each retaining element overlies a portion of an adjacent one of the retaining elements.

7 Claims, 1 Drawing Sheet

PIPE COUPLING CAPSULATION ASSEMBLY WITH RETAINING ELEMENTS

FIELD OF THE INVENTION

The present invention relates generally to pipe coupling assemblies, such as those used to sealingly connect pipes together or to repair breaks or leaks in pipes, and particularly for pipe coupling capsulation applications in which the pipe coupling fits over existing bell-shaped joints, sleeve joints or other joints and seals the joint.

BACKGROUND OF THE INVENTION

Many kinds of removable band-type couplings for pipes exist in the art. It is noted that throughout the specification and claims, the term "pipe" encompasses any kind of generally cylindrical object, and the terms "clamp" and "coupling" are used interchangeably.

Pipeline leakage must be prevented for both economic and environmental reasons, depending on the nature of the fluid being transported. When needed repairs are inevitably carried out under field conditions, and in many situations there is a requirement that the flow of fluid in the pipeline may not be interrupted for any reason. Thus replacement of a faulty pipe joint is not an option.

Prior art seals are not capable of being used externally over an existing coupling or existing bell joint. Prior art seals lack the internal space needed if the repair seal is to be applied over and around an existing but leaking pipe joint. A further problem with many prior-art seals arises when the fluid being transported is under high pressure. This results in the seal lips being gradually pushed outwards, eventually leading to complete seal failure.

A solution to the above problems is described in U.S. Pat. No. 9,551,444, assigned to Eliezer Krausz Industrial Development Ltd., which describes capsulation assembly, which is an external seal completely enveloping the existing leaking seal. The capsulation assembly fits over existing bell-shaped joints, sleeve joints and the like, and seals the joint. The capsulation assembly has retaining elements which are received in slots formed in an annular seal.

SUMMARY OF THE INVENTION

The present invention seeks to provide an improved pipe coupling capsulation assembly, as is described more in detail further below. In the present invention, the seal is prevented from axial migration by retaining elements that face the open ends of the pipe coupling capsulation assembly.

There is provided in accordance with an embodiment of the present invention a pipe coupling capsulation assembly including a band having an inner annular seal element wrappable around a pipe, opposing clamp members that extend from the band, at least one tightening element for clamping together the clamp members, and a plurality of retaining elements extending from the band. Each of the retaining elements may include a first portion from which extends a second portion from which extends a third portion, and wherein the retaining elements are arranged all around a perimeter of an open end of the band, such that the third portion of one of the retaining elements overlies an end portion of the first portion of an adjacent one of the retaining elements.

In accordance with an embodiment of the present invention, for each of the retaining elements, the second portion is bent with respect to the first portion and the third portion is bent with respect to the second portion. The retaining elements may be perpendicular to an outer contour of the band, and the third portion may be parallel to the first portion, within a deviation of 0-20% from being exactly perpendicular or parallel.

In accordance with an embodiment of the present invention, the retaining elements are secured to the band with L-shaped legs which are joined to the band and the retaining elements. The end portion may be bent with respect to rest of the first portion.

In accordance with an embodiment of the present invention, the annular seal element is part of or assembled with a split ring, and the split ring is lockable with a lock member.

BRIEF DESCRIPTION OF THE DRAWINGS

The present invention will be understood and appreciated more fully from the following detailed description, taken in conjunction with the drawings in which.

DETAILED DESCRIPTION OF EXEMPLARY EMBODIMENTS

Figure 1:
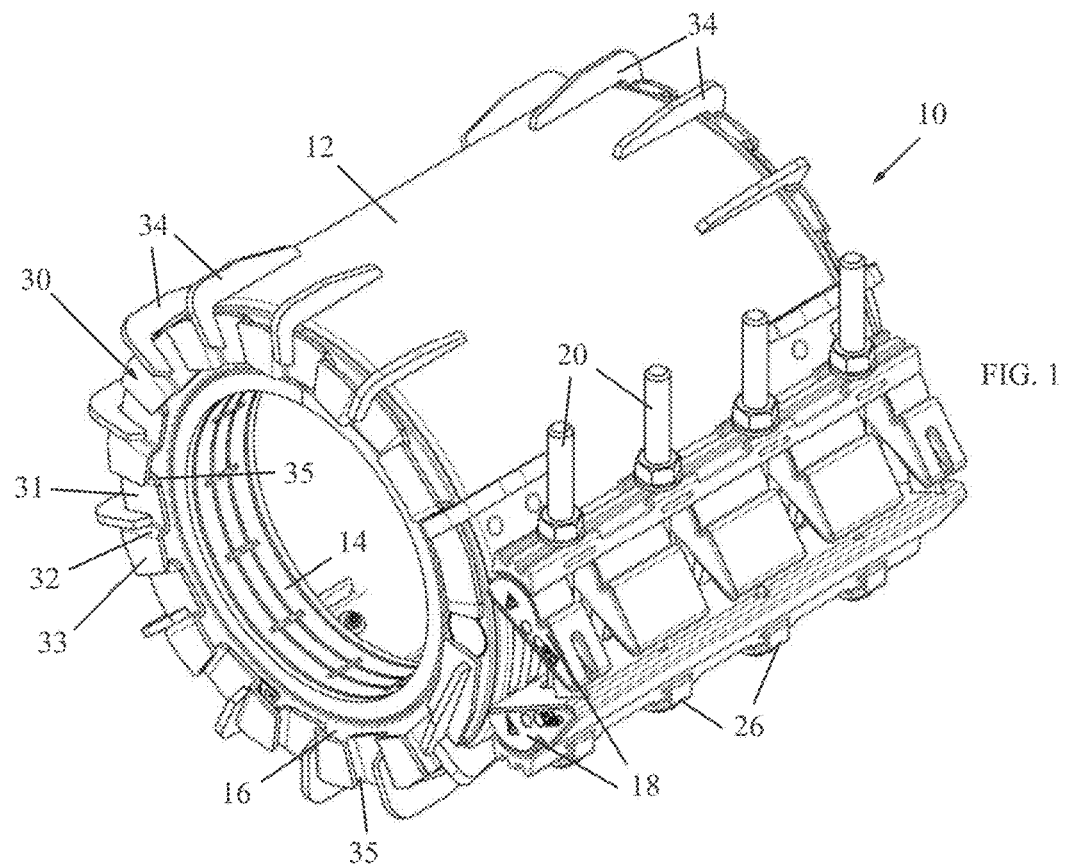
FIGS. 1 and 2 are perspective and exploded illustrations, respectively, of a pipe coupling capsulation assembly, constructed and operative in accordance with a non-limiting embodiment of the present invention.
Figure 2:
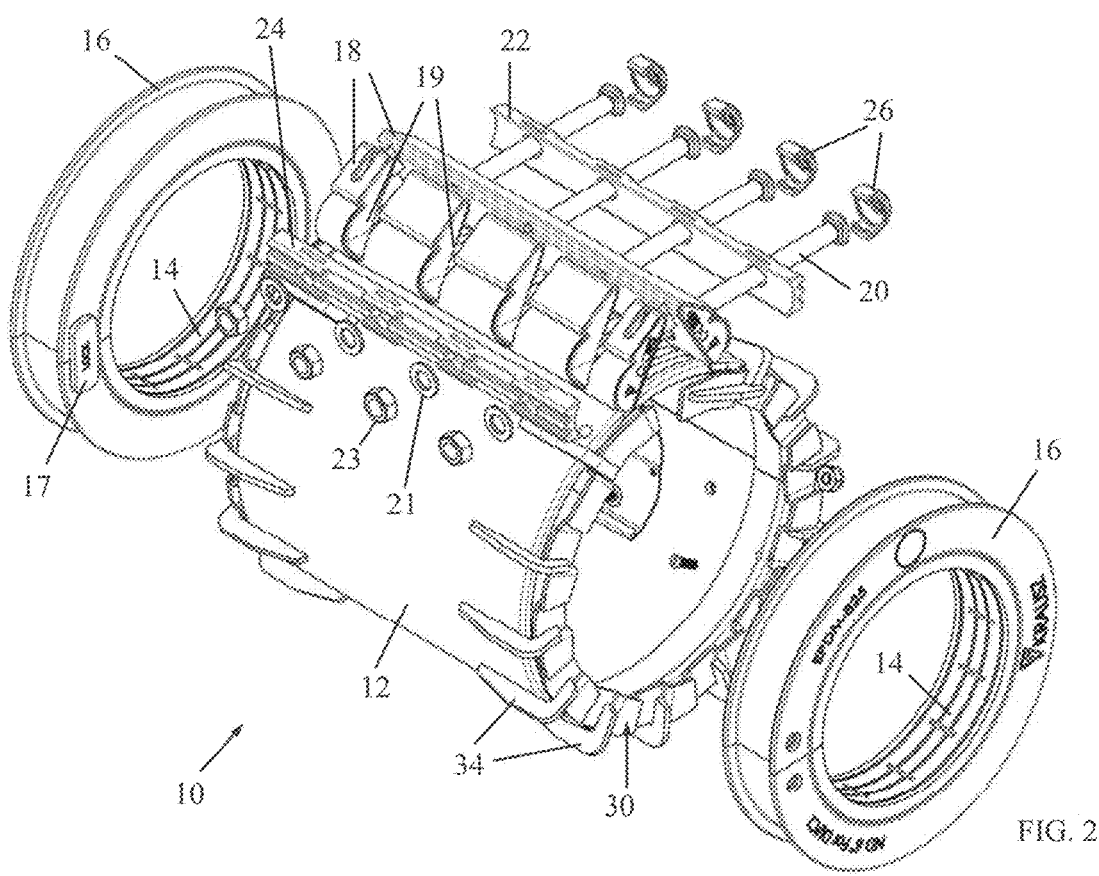

Reference is now made to FIGS. 1 and 2, which illustrate a pipe coupling capsulation (or encapsulation) assembly 10, constructed and operative in accordance with a non-limiting embodiment of the present invention.

Assembly 10 includes a band 12 having an inner annular seal element 14 wrappable around a pipe (not shown). Band 12 is typically, but not necessarily, made of metal and annular seal element 14 is typically, but not necessarily, made of an elastomer, such as natural or synthetic rubber, e.g., EPDM (ethylene propylene diene monomer) or neoprene. In the illustrated embodiment, two annular seal elements 14 are provided, each one at opposite ends of the band 12. Each annular seal element 14 may be part of a ring 16 (or ring 16 may be a separate part in which the seal element is placed), which may be a split ring as shown in FIG. 2. The split ring 16 may be locked, after installation around a pipe, with a lock member 17, such as a tab fastened to both parts of the split ring (the tab overlies the split line of the ring 16). The annular seal element 14 may include a foldable seal, a multi-layer seal (whose layers may be separated and removed from each other to accommodate different diameter pipes), or other kinds of seals.

Opposing clamp members 18 extend radially outwards from ends of band 12 and are formed with mounting apertures 19. Clamp members 18 are clamped and tightened together with one or more tightening elements 20, such as but not limited to, bolts that pass through a bolt plate or holder 22, and which are tightened by nuts 23 (with optional washers 21) at a nut plate 24.

A keeper 26 may be assembled over the tightening element 20, as described in U.S. Pat. No. 8,408,606, assigned to Eliezer Krausz Industrial Development Ltd. Keeper 26 prevents the tightening element 20 from falling out of their mounting openings and makes the tightening operation much quicker and easier. Keeper 26 has a cover portion that lies over an end of the tightening element 20. Keeper 26 has legs which are inserted into apertures formed in the holder 22.

In the illustrated embodiment, band 12, annular seal element 14, and ring 16 are split. However, the invention can alternatively be carried out with a configuration in which band 12, annular seal element 14, and ring 16 are constructed of two opposing halves.

In accordance with a non-limiting embodiment of the present invention, a plurality of retaining elements 30 are assembled to band 12. The retaining elements 30 face an open end of band 12 and are preferable, although not necessarily, perpendicular to the outer contour of band 12, within a deviation of 0-20% from being exactly perpendicular. Each retaining element 30 includes a first portion 31 from which extends a second portion 32 from which extends a third portion 33. Second portion 32 is bent with respect to first portion 31 and third portion 33 is bent with respect to second portion 32. In the illustrated embodiment, third portion 33 is parallel to first portion 31 within a deviation of 0-20% from being exactly parallel. It is noted that the term "bent" encompasses not only a bending action, but also that the parts can have this configuration even without a bending action, such as but not limited to, machining, casting or other methods.

The retaining elements 30 may be secured to band 12 with L-shaped legs 34 which are joined to band 12 and retaining elements 30, such as by welding, bonding or other suitable technique. Alternatively, retaining elements 30 may be part of band 12 and bent or otherwise formed to the described configuration. The retaining elements 30 may be made of stainless steel or other suitably strong material.

The retaining elements 30 are arranged all around the perimeter of each of the open ends of band 12, such that the third portion 33 of one of the retaining elements 30 overlies an end portion 35 of the first portion 31 of an adjacent one of the retaining elements 30. The end portion 35 may be bent slightly with respect to the rest of the first portion 31. Similarly, the part of the third portion 33 that overlies the end portion 35 may also be bent (towards the end portion 35) so that the part of the third portion 33 that overlies the end portion 35 can circumferentially abut against the end portion 35.

In accordance with a non-limiting embodiment of the present invention, the pipe coupling encapsulation assembly 10 can be used to seal over leaking pipe joint couplings, without having to interrupt flow through the pipes and joint couplings.

In use, a worker places the two annular seal elements 14 with their rings 16 around the pipes on opposite sides of the leaking joint coupling. The worker places band 12 around the leaking joint coupling such that opposite end portions of band 12 overlie annular seal elements 14. The worker than tightens opposing clamp members 18 towards each other with tightening elements 20 and the repair is complete. The retaining elements 30 lie against the face of ring 16 and prevent the annular seal elements 14 from axially moving out of the repaired seal, even under high fluid pressure.

What is claimed is:

1. A pipe coupling capsulation assembly comprising:
   a band having an inner annular seal element wrappable around a pipe;
   opposing clamp members that extend from said band;
   at least one tightening element for clamping together said clamp members; and
   a plurality of retaining elements extending from said band, each of said plurality of retaining elements overlying a portion of an adjacent one of said plurality of retaining elements, and wherein said plurality of retaining elements are secured to said band with L-shaped legs which are joined to said band and said plurality of retaining elements.

2. The pipe coupling capsulation assembly according to claim 1, wherein each of said plurality of retaining elements comprises a first portion from which extends a second portion from which extends a third portion, and wherein said plurality of retaining elements are arranged all around a perimeter of an open end of said band, such that the third portion of one of said plurality of retaining elements overlies an end portion of the first portion of an adjacent one of said plurality of retaining elements.

3. The pipe coupling capsulation assembly according to claim 2, wherein for each of said plurality of retaining elements, said second portion is bent with respect to said first portion and said third portion is bent with respect to said second portion.

4. The pipe coupling capsulation assembly according to claim 2, wherein for each of said plurality of retaining elements, said third portion is parallel to said first portion within a deviation of 0-20%.

5. The pipe coupling capsulation assembly according to claim 2, wherein for each of said plurality of retaining elements, said end portion is bent with respect to a rest of said first portion.

6. The pipe coupling capsulation assembly according to claim 1, wherein said plurality of retaining elements are perpendicular to an outer contour of said band, within a deviation of 0-20%.

7. The pipe coupling capsulation assembly according to claim 1, wherein said annular seal element is part of or assembled with a split ring, and the split ring is lockable with a lock member.

* * * * *